Jan. 20, 1970 K. HÜBNER ET AL 3,491,274

DIFFUSED RESISTANCE IN AN INTEGRATED CIRCUIT

Original Filed June 2, 1966

Kurt Hübner and
Eric Vittoz,
Inventor

By Wenderoth, Lind and Ponack,
Attorneys

United States Patent Office 3,491,274
Patented Jan. 20, 1970

3,491,274
DIFFUSED RESISTANCE IN AN INTEGRATED CIRCUIT

Kurt Hübner, Neuchatel, and Eric Vittoz, Hauterive, Neuchatel, Switzerland, assignors to Centre Electronique Horloger S.A., Neuchatel, Switzerland, a Swiss corporation Continuation of application Ser. No. 554,776, June 2, 1966. This application Feb. 28, 1969, Ser. No. 805,108
Claims priority, application Switzerland, June 4, 1965, 7,837/65
Int. Cl. H01l 11/00, 3/00, 5/00
U.S. Cl. 317—235 2 Claims This application is a continuation of Ser. No. 554,776 filed June 2, 1966, now abandoned.

In an integrated circuit (miniaturized) most of the elements such as resistances, capacitances, diodes, transistors are fixed directly in a common semi-conducting block.

As regards the resistances, these are constituted by lengthened regions obtained by diffusion. One distinguishes between monodiffused and bidiffused resistances.

These resistances differ from conventional resistances in that they possess a large distributed capacity due to the junction PN which surrounds them, this capacity finding expression in a time constant limiting the time of rising of the voltage at the terminals of the resistance when a surge of current is applied thereto.

The purpose of the invention is to modify the resistance so as to reduce its time constant, the values of the resistance and of the total parasite capacity remaining the same.

The object of the invention is a diffused resistance in an integrated circuit, which is characterized in that it is segmented longitudinally into at least two segments fixed in zones insulated one from the other, the different segments being connected in series, all in order to reduce the time constant of the resistance.

The drawing shows, by way of example, one embodiment of the resistance according to the invention.

Figure 1:
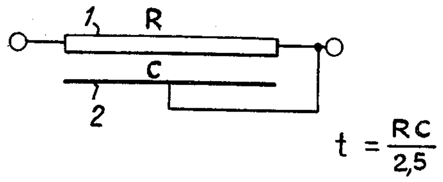
FIGS. 1 to 4 are explanatory diagrams, FIG. 4 corresponding to the embodiment shown in FIG. 5.

FIG. 1 shows the circuit equivalent to a diffused resistance. The diffused region corresponding to the ohmic component R is indicated by 1. The other side of the junction PN, the resistance of which is neglected, is represented by 2. The capacity of the junction is C.

The time constant $t$ limiting the time of rising of the voltage at the terminals of this resistance, when a surge of current is applied thereto, is equal to about $RC/2.5$ only. This is explained by the fact that the capacity C does not charge itself over its whole length to the voltage appearing at the terminals of R. It charges itself, on an average, to a fraction of this voltage approaching one half. FIG. 1 corresponds to the case when the substratum is not left to float but connected to one end terminal.

Figure 2:
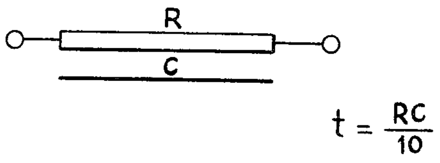
Figure 3:
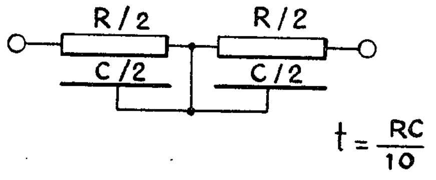

FIGS. 2 and 3 show the case when the substratum is left to float. For reasons of symmetry one may replace the diagram according to FIG. 2 by that according to FIG. 3. Comparing with FIG. 1, one sees that the time constant $t$ is then $$t=\frac{R/2.C/2}{2.5}=\frac{R.C}{10}$$

By eliminating the connection one has thus reduced the time constant by four.

Figure 4:
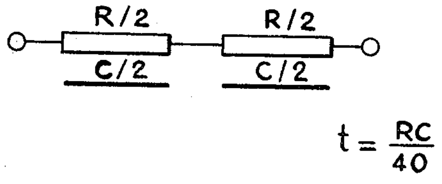

If, according to one embodiment, one segments the resistance into two segments connected in series, the two substrata being left to float and insulated one from the other, one obtains the diagram shown in FIG. 4. The time constant $t$ of the two segments connected in series is the same as that of a single segment, that is to say $$t=\frac{R/2.C/2}{10}=\frac{R.C}{40}$$

This value, which has been verified in practice, is four times lower than that one can obtain without segmenting the resistance. By segmenting the resistance into $n$ equal parts, one obtains a time constant $n^2$ times smaller.

Figure 5:
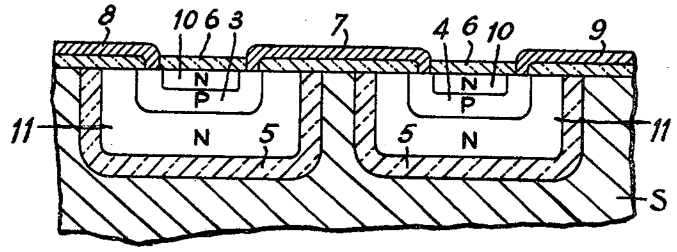
FIG. 5 is a view in longitudinal section of a resistance composed of two segments.

FIG. 5 is a view in longitudinal section of a resistance segmented into two segments. It is constituted by two boxes made in the semi-conducting block S, block enclosing other elements not shown of the integrated circuit. The resistances themselves 3 and 4 are obtained by bidiffusion with insulation by quartz walls 5 and 6.

The adjacent ends of the two resistant parts 3 and 4 are connected by a metallic layer 7, whereas the two terminals of the resistance are constituted by two metallic layers 8 and 9 connected to the other ends of the two resistant parts 3 and 4. The regions 10 and 11 represent the counter-electrodes of the distributed capacities, in the two segments of the resistance.

The segmented resistance of FIG. 5 has thus a time constant $t$ which is equal to a quarter of that of a non segmented resistance, formed by a single isolated box, the resistive layer having the same total length (same resistance) and same total surface (same capacity).

It should be noted that in integrated circuits with low power consumption as well as in those with a high commutation speed, the distributed capacity and the time constant which result therefrom play a decisive role in the performance. For circuits intended for portable timing apparatus, such a segmentation of the resistances allows of still utilizing the techniques of conventional diffusions which, otherwise, could no longer be employed.

The fact that a junction PN does not have a fixed capacity leads to modifications. For low voltages, however, of the order of the volt, one may neglect, to a first approximation, the variations of the capacity as a function of the voltage as well as the effects of excessive voltages.

Moreover, theoretical considerations verified experimentally show that the improvements provided are not modified by the fact that a distributed diode is in reality associated with the distributed capacity (junction PN). In the resistance shown in FIG. 1, care must be taken to connect to the substratum the end of the resistance which does not polarize the junction PN in the straight direction.

What is claimed is:

1. A composite diffused resistance in a monolithic integrated circuit comprising $n$ number of diffused partial resistances having lower values of ohmic resistance than the composite resistance, every partial resistance being buried in a zone of semiconducting material which comprises only one partial resistance and which is surrounded by walls electrically insulating said zone from other similar zones and separating said partial resistances one from another, all of said partial resistances forming said composite resistance being connected in series by metallic layers bridging said walls of said zones, such that said series-connected buried resistances have a time constant reduced by $$\frac{1}{n^2}$$

2. A composite diffused resistance in a monolithic integrated circuit as defined in claim 1 wherein the number of partial resistances is at least two, and said walls are fabricated of a dielectric insulator material.

(References on following page)

References Cited

UNITED STATES PATENTS

| | | | |
|---|---|---|---|
| 3,317,850 | 5/1967 | Hilbiber | 330—23 |
| 3,293,087 | 3/1963 | Porter | 148—175 |
| 3,299,329 | 1/1967 | Pollock | 317—235 |
| 3,335,340 | 8/1967 | Barson. | |
| 3,271,685 | 9/1966 | Husher | 325—440 |

OTHER REFERENCES

Motorola Monitor, vol. 2, No. 2, June 1964, pp. 8–17.

JAMES D. KALLAM, Primary Examiner

MARTIN H. EDLOW, Assistant Examiner

U.S. Cl. X.R

317—234